United States Patent
Zhou et al.

(10) Patent No.: US 12,149,429 B2
(45) Date of Patent: Nov. 19, 2024

(54) NETWORK OAM METHOD AND APPARATUS

(71) Applicant: Huawei Technologies Co., Ltd., Shenzhen (CN)

(72) Inventors: Tianran Zhou, Beijing (CN); Shuping Peng, Beijing (CN); Yuezhong Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/701,167

(22) Filed: Mar. 22, 2022

(65) Prior Publication Data

US 2022/0217070 A1 Jul. 7, 2022

Related U.S. Application Data

(63) Continuation of application No. PCT/CN2020/116580, filed on Sep. 21, 2020.

(30) Foreign Application Priority Data

Sep. 24, 2019 (CN) .......................... 201910906580.3
Oct. 17, 2019 (CN) .......................... 201910988464.0

(51) Int. Cl.
*H04L 43/50* (2022.01)
*H04L 43/065* (2022.01)
(Continued)

(52) U.S. Cl.
CPC ............ *H04L 43/50* (2013.01); *H04L 43/065* (2013.01); *H04L 43/067* (2013.01); *H04L 43/10* (2013.01)

(58) Field of Classification Search
CPC ..... H04L 43/50; H04L 43/065; H04L 43/067; H04L 43/10; H04L 43/08; H04L 41/0846;
(Continued)

(56) References Cited

U.S. PATENT DOCUMENTS 9,596,164 B1 * 3/2017 Kumar .................... H04L 43/12
2006/0056301 A1 3/2006 Soncodi
(Continued)

FOREIGN PATENT DOCUMENTS

| CN | 101635656 A | 1/2010 |
| CN | 101998454 A | 3/2011 |

(Continued)

OTHER PUBLICATIONS

Brockners et al., RFC 9197: Data Fields for in Situ Operations, Administration, and Maintenance (IOAM), IP.com Prior Art Database Technical Disclosure, 41 pages, May 2022. (Year: 2022).*

(Continued)

*Primary Examiner* — Patrice L Winder
(74) *Attorney, Agent, or Firm* — Conley Rose, P.C.

(57) ABSTRACT

An operation, administration, and maintenance (OAM) method includes a first network device determines OAM configuration information of a target application, where the OAM configuration information includes an OAM measurement manner, and the first network device forwards the OAM configuration information to a second network device.

20 Claims, 5 Drawing Sheets

---

A first network device receives a packet, where the packet includes feature information of a target application — S103

The first network device determines the OAM configuration information of the target application based on the feature information of the target application — S1011

The first network device forwards the OAM configuration information to a second network device — S102

(51) Int. Cl.
*H04L 43/067* (2022.01)
*H04L 43/10* (2022.01)

(58) Field of Classification Search
CPC .. H04L 41/0893; H04L 41/5051; H04L 41/34
See application file for complete search history.

(56) References Cited

U.S. PATENT DOCUMENTS

| | | | |
|---|---|---|---|
| 2008/0159287 A1* | 7/2008 | Nagarajan | H04L 69/22 370/252 |
| 2010/0118708 A1 | 5/2010 | Long et al. | |
| 2011/0188457 A1* | 8/2011 | Shu | H04W 72/04 370/329 |
| 2011/0222412 A1 | 9/2011 | Kompella | |
| 2013/0010600 A1 | 1/2013 | Jocha et al. | |
| 2017/0026269 A1 | 1/2017 | Liang et al. | |
| 2017/0104629 A1* | 4/2017 | Cobb | H04L 41/083 |
| 2018/0091410 A1* | 3/2018 | Browne | H04L 41/5009 |
| 2018/0152369 A1* | 5/2018 | McCallen | H04L 43/08 |
| 2019/0230012 A1* | 7/2019 | Azizullah | H04L 43/50 |
| 2020/0084147 A1* | 3/2020 | Gandhi | H04L 41/40 |
| 2020/0092184 A1* | 3/2020 | Park | H04L 43/50 |

FOREIGN PATENT DOCUMENTS

| | | |
|---|---|---|
| CN | 106341337 A | 1/2017 |
| CN | 106936661 A | 7/2017 |
| CN | 108768849 A | 11/2018 |
| CN | 109218058 A | 1/2019 |
| CN | 109379247 A | 2/2019 |
| CN | 105308904 B | 5/2019 |
| CN | 110166311 A | 8/2019 |
| CN | 110971445 A | 4/2020 |
| EP | 4044514 A1 | 8/2022 |
| JP | 2002157172 A | 5/2002 |
| JP | 2011030051 A | 2/2011 |

OTHER PUBLICATIONS

J. Horalek et al., Implementation and Testing of Cisco IP SLA in Smart Grid Environments, MIPRO 2017, IEEE, May 22-26, 2017, pp. 450-454. (Year: 2017).*

Chunyan Fu et al., EPLE: an Efficient Passive Lightweight Estimator for SDN Packet Loss Measurement, 2016 IEEE Conference on Network Function Virtualization and Software Defined Networks, IEEE, 7 pages. (Year: 2016).*

Bhandari, S., et al, "In-situ OAM IPv6 Options," draft-ioametal-ippm-6man-ioam-ipv6-options-01, Oct. 20, 2018, 9 pages.

Z. Li, "Service-aware IPv6 Network," draft-li-6man-service-aware-ipv6-network-00, Mar. 11, 2019, 14 pages.

* cited by examiner

NETWORK OAM METHOD AND APPARATUS

CROSS-REFERENCE TO RELATED APPLICATIONS

This is a continuation of International Patent Application No. PCT/CN2020/116580 filed on Sep. 21, 2020, which claims priority to Chinese Patent Application No. 201910906580.3 filed on Sep. 24, 2019 and Chinese Patent Application No. 201910988464.0 filed on Oct. 17, 2019. All of the aforementioned patent applications are hereby incorporated by reference in their entireties.

TECHNICAL FIELD

Embodiments of this application relate to the field of computer technologies, and in particular, to a network operation, administration, and maintenance (OAM) method and apparatus.

BACKGROUND

Network management includes OAM. With help of the OAM, fault detection, path discovery, fault location, and performance monitoring can be performed to analyze, predict, plan, and configure a network. In addition, the OAM helps test the network and its services and manage faults.

The OAM on the network may include: In a process of forwarding a packet, a device (for example, a switch or a router) on a forwarding path collects OAM information and reports the OAM information to a controller in the network, and the controller analyzes the OAM information to evaluate a network status. Currently, the OAM information may be collected for a specific data stream according to a preset OAM policy (including an OAM method, content, and frequency). For example, as shown in FIG. 1, in a process of sending data from server 1 to server 2, a data transmission path includes a node 1, a node 2, a node 3, and a node 5. An OAM policy corresponding to a data flow is configured on the node 2. After receiving a data flow, the node 2 determines the OAM policy corresponding to the data flow, collects OAM information according to the OAM policy, and forwards the OAM policy and the OAM information to the node 3. The node 3 collects the OAM information according to the OAM policy and sends the OAM information to the node 5. Similarly, the node 5 also collects the OAM information. In this case, the node 5 may obtain the OAM information collected by the node 2, the node 3, and the node 5, and further send all the OAM information to the controller.

However, the OAM information is collected only according to the OAM policy corresponding to the data flow. Because configuration of the OAM policy is not flexible enough, the OAM policy may not be suitable for an actual application (APP), the collected OAM information is not specific, and therefore an OAM effect is relatively poor.

SUMMARY

Embodiments of this application provide a network OAM method and apparatus, to determine OAM configuration information of a target application, thereby improving an OAM effect of a network.

To achieve the foregoing objective, the embodiments of this application use the following technical solutions.

According to a first aspect, an embodiment of this application provides a network operation, administration and maintenance OAM method, where the method includes: determining, by a first network device, OAM configuration information of a target application, where the OAM configuration information includes an OAM measurement manner; and forwarding, by the first network device, the OAM configuration information to a second network device.

In this embodiment of this application, after the first network device determines the OAM configuration information, the first network device encapsulates the OAM configuration information into a packet received by the first network device, and forwards the packet to the second network device, so that the second network device collects OAM information based on the OAM configuration information.

By using the method, OAM for a specific target application can be implemented, so as to improve OAM pertinence and improve an OAM effect.

In a possible implementation, before the determining, by a first network device, OAM configuration information of a target application, the network OAM method provided in this embodiment of this application may further include: receiving, by the first network device, a packet, where the packet includes characteristic information of the target application.

In this embodiment of this application, the packet received by the first network device is a packet of the target application, the packet includes an information header of the target application (referred to as an APP information header hereinafter), and the APP header includes the characteristic information of the target application. After receiving the packet, the first network device decapsulates the packet, to obtain the characteristic information of the target application from the APP information header.

It should be noted that, in this embodiment of this application, when the OAM is performed based on an actual service of the target application, the packet may be a packet corresponding to the actual service of the target application. When the active OAM is performed on the forwarding path corresponding to the target application, the packet is a test packet.

The method of determining, by the first network device, the OAM configuration information of the target application may specifically include: determining, by the first network device, the OAM configuration information of the target application based on the characteristic information of the target application.

In a possible implementation, the characteristic information of the target application is service requirement information of the target application. In this way, the method of determining, by the first network device, the OAM configuration information of the target application may specifically include: determining, by the first network device, the OAM configuration information of the target application based on the service requirement information of the target application in the packet.

In this embodiment of this application, the APP information header of the packet includes the service requirement information (which may also be a service-level agreement (SLA) parameter) of the target application. The first network device decapsulates the received packet, and obtains the service requirement information from the APP information header of the packet.

In a possible implementation, the service requirement information of the target application includes at least one of latency information, packet loss information, and bandwidth information.

The service requirement information may also be referred to as the SLA parameter, and the latency information may include one or more of an end-to-end latency, a hop-by-hop latency, or a forwarding latency. The packet loss information may include a packet loss rate. The bandwidth information may include available bandwidth.

Optionally, the service requirement information may further include an upper limit of the latency information and/or an upper limit of the packet loss information, for example, a maximum end-to-end latency less than 3 milliseconds and/or a maximum packet loss rate less than 0.0001.

Optionally, the service requirement information may further include color information (which may also be referred to as an SLA color) of the service requirement, and the color information of the service requirement may implicitly indicate one or more of the latency information, the packet loss information, and the bandwidth information.

In this embodiment of this application, the first network device may determine the OAM configuration information based on content of the service requirement information. For example, when the first network device performs the OAM based on the actual service of the target application, if the service requirement information specifies that the maximum packet loss rate is less than a value, the first network device may determine, based on the requirement of the target application for the packet loss rate (that is, the maximum packet loss rate is less than the specified value), that a measurement object in the OAM configuration information is the packet loss rate, and determine an OAM measurement manner and a measurement granularity when the OAM is performed for the packet loss rate. When the active OAM is performed based on the forwarding path corresponding to the target application, if the service requirement information is a latency and the maximum end-to-end latency is less than a value, the first network device determines, based on the latency requirement of the target application (that is, the maximum end-to-end latency is less than the specified value), that the measurement object in the OAM configuration information is the latency, and determines an OAM measurement manner and a measurement frequency when the OAM is performed for the latency.

According to the method, the first network device determines the OAM configuration information for the target application based on the service requirement information of the target application carried in the data packet (for example, different service requirements may correspond to different OAM configuration information), so that an OAM configuration manner is more flexible.

In a possible implementation, the characteristic information of the target application is identification information of the target application. In this way, the method of determining, by the first network device, the OAM configuration information of the target application may specifically include: determining, by the first network device, the OAM configuration information of the target application based on the identification information of the target application in the packet.

In this embodiment of this application, the APP information header of the packet includes the identification information (denoted as an APP ID) of the target application. The first network device decapsulates the received packet, and obtains the APP ID from the APP information header of the packet.

In this embodiment of this application, a correspondence between identification information of an application and OAM configuration information is configured on the first network device. After obtaining the identification information of the target application, the first network device first matches the identification information of the target application based on the correspondence between the identification information of the application and the OAM configuration information, and further determines that the OAM configuration information corresponding to the identification information of the target application is the OAM configuration information of the target application.

In this embodiment of this application, the first network device forwards the determined OAM identification information to the second network device when matching the identification information of the target application according to the APP ID in the packet received by the first network device. In this way, the second network device may obtain the OAM configuration information and determine, based on an actual situation, whether to collect the OAM information (that is, whether to perform an OAM function). Similarly, another subsequent network device may also obtain the OAM configuration information and determine whether to collect the OAM information. When the first network device does not match the identification information of the target application, the first network device, the second network device, and another subsequent network device do not collect the OAM information (that is, do not perform an OAM function), and only normally forward the packet.

In a possible implementation, in this embodiment of this application, which devices (namely, nodes) in the network need to collect the OAM information may be pre-configured. In other words, for each device in the network, whether the device needs to collect the OAM information may be configured. Specifically, which devices need to collect the OAM information may be configured based on an actual requirement. This is not limited in this embodiment of this application.

For example, a network device receives a packet sent by a previous-hop network device of the network device. If the network device is configured to collect OAM information, the network device decapsulates the received packet to obtain the OAM configuration information, collects the OAM information according to the OAM configuration information, and then encapsulates the OAM information into an OAM header of the packet, and sends the packet including the OAM configuration information and the OAM information to a next-hop network device of the network device. Otherwise, the network device does not collect the OAM information, and directly forwards the packet including the OAM configuration information to the next-hop network device of the network device.

According to the method, the first network device determines the OAM configuration information for the target application based on the identification information of the target application carried in the data packet (for example, different applications may be configured with different OAM configuration information), so that the OAM configuration manner is more flexible.

In a possible implementation, the packet received by the first network device includes the OAM measurement manner.

In other words, the OAM measurement manner may be preconfigured and carried in the packet. In this way, after receiving the packet, the first network device may obtain the OAM measurement manner.

In a possible implementation, the OAM measurement manner includes at least one of the following manners: an In-Situ Operations, Administration, and Maintenance (IOAM) manner, an Internet Protocol Flow Performance (IPFPM) manner, an In-Situ Flow Information Telemetry (IFIT) manner, a Two-way Active Measurement Protocol (TWAMP) manner, a One-way Active Measurement Protocol (OWAMP) manner, and a ping manner.

In a possible implementation, the OAM configuration information further includes at least one of the following information: an OAM measurement object, a measurement granularity, and a measurement frequency.

It should be understood that the OAM measurement object may include at least one of a latency, a packet loss rate, and an available bandwidth. The OAM measurement granularity may include per-flow or per-packet. The OAM measurement frequency may be a sending frequency of a data packet (or a measurement packet).

It should be noted that, in this embodiment of this application, when the OAM is performed on the network, the OAM may be performed based on the actual service of the target application (which may be understood as flow-by-flow measurement), or the active OAM may be performed on the forwarding path corresponding to the target application (which may be understood as path measurement). When the OAM is performed based on the actual service of the target application, the OAM configuration information may include the measurement granularity, and the OAM measurement manner may include an IOAM manner, an IPFPM manner, and an IFIT manner. When the active OAM is performed on the forwarding path of the target application, the OAM configuration information may include the measurement frequency, and the OAM measurement manner may include a TWAMP manner, an OWAMP manner, a ping manner, and the like.

It should be understood that when the packet carries the OAM measurement manner (for example, the IOAM manner is specified in the packet), after the first network device obtains the service requirement information of the target application or the identification information of the target application from the packet, the first network device determines other information (for example, the measurement object, the measurement granularity, or the measurement frequency) in the OAM configuration information based on the service requirement information of the target application or the identification information of the target application.

In this embodiment of this application, after the first network device determines the OAM configuration information, the first network device encapsulates the OAM configuration information into a packet received by the first network device, and forwards the packet to the second network device, so that the second network device collects OAM information based on the OAM configuration information. Herein, it should be noted that, in a case in which the packet carries the OAM measurement manner, only the determined OAM measurement object, the OAM measurement granularity, or the measurement frequency are encapsulated into the packet.

Optionally, the OAM information collected by the network device varies according to OAM measurement objects. For example, in an implementation, when the OAM measurement object is a latency, the OAM information collected by the network device may include a timestamp, a node ID, and an interface ID, where the interface ID may include an inbound interface and an outbound interface of a packet, the timestamp may include a time when the packet arrives at the inbound interface and a time when the packet leaves the outbound interface.

In a possible implementation, before the determining, by a first network device, OAM configuration information of a target application, the network OAM method provided in this embodiment of this application may further include: obtaining, by the first network device, enabling information, where the enabling information is used to instruct the first network device to determine the OAM configuration information of the target application.

In a possible implementation, the enabling information is carried in the packet received by the first network device. Alternatively, the enabling information is preconfigured on the first network device.

In this embodiment of this application, the enabling information is indication information (for example, an instruction). The first network device may determine, based on a value of the indication information, whether the OAM configuration information of the target application needs to be determined. For example, "0" or "1" may be used to represent the enabling information. For example, "1" may be used to indicate enabling, which means that the first network device needs to determine the OAM configuration information, or "0" may be used to indicate enabling. In this embodiment of this application, another flag that meets an actual use requirement may be used to set the foregoing enabling information. Details are not listed one by one in this embodiment of this application.

In a possible implementation, the identification information of the target application may be used as the enabling indication information.

According to the network OAM method provided in this embodiment of this application, the first network device in the network determines the OAM configuration information of the target application, and the first network device forwards the OAM configuration information to the second network device. It can be learned that, according to the technical solutions in the embodiments of this application, the OAM configuration information for the target application can be determined. Therefore, the OAM configuration manner is more flexible.

Further, the network device that needs to collect OAM information in the network collects and reports the OAM information according to the OAM configuration information. Because the OAM configuration information determined by the first network device is determined based on the characteristic information of the target application, the OAM information collected according to the OAM configuration information can more accurately reflect a running status of the target application to some extent, and therefore an OAM effect of the network can be improved.

That is, according to the network OAM method provided in this embodiment of this application, OAM for a specific target application can be implemented, so that OAM pertinence is improved, and an OAM effect is improved.

According to a second aspect, an embodiment of this application provides a network device, where the network device is a first network device, and the network device includes a determining module and a sending module. The determining module is configured to determine OAM configuration information of a target application, where the OAM configuration information includes an OAM measurement manner. The sending module is configured to forward the OAM configuration information to a second network device.

In a possible implementation, the network device provided in this embodiment of this application further includes a receiving module, where the receiving module is configured to receive a packet and the packet includes characteristic information of the target application. In this way, the determining module is specifically configured to determine the OAM configuration information of the target application based on the characteristic information of the target application.

In a possible implementation, the characteristic information of the target application is service requirement information of the target application. The determining module is specifically configured to determine the OAM configuration information of the target application based on the service requirement information of the target application.

In a possible implementation, the service requirement information of the target application includes at least one of latency information, packet loss information, and bandwidth information.

In a possible implementation, the network device provided in this embodiment of this application further includes a receiving module, where the receiving module is configured to receive a packet, and the packet includes identification information of the target application.

In a possible implementation, the characteristic information of the target application is identification information of the target application. The determining module is specifically configured to determine the OAM configuration information of the target application based on the identification information of the target application.

In a possible implementation, the packet received by the first network device includes the OAM measurement manner.

In a possible implementation, the OAM measurement manner includes at least one of the following manners: an IOAM manner, an IPFPM manner, an IFIT manner, a TWAMP manner, an OWAMP manner, and a ping manner.

In a possible implementation, the OAM configuration information further includes at least one of the following information: an OAM measurement object, a measurement granularity, and a measurement frequency.

In a possible implementation, the network device provided in this embodiment of this application further includes an obtaining module, where the obtaining module is configured to obtain enabling information, where the enabling information is used to instruct the first network device to determine the OAM configuration information of the target application.

According to a third aspect, an embodiment of this application provides a network device, including a processor and a memory coupled to the processor, where the memory is configured to store a computer instruction. When the network device runs, the processor executes the computer instruction stored in the memory, so that the network device performs the network OAM method according to any one of the first aspect and the possible implementations of the first aspect.

According to a fourth aspect, an embodiment of this application provides a network device. The network device exists in a product form of a chip, and a structure of the network device includes a processor and a memory. The memory is configured to be coupled to the processor, the memory is configured to store a computer instruction, and the processor is configured to execute the computer instruction stored in the memory, so that the network device performs the network OAM method according to any one of the first aspect and the possible implementations of the first aspect.

According to a fifth aspect, an embodiment of this application provides a computer readable storage medium. The computer readable storage medium may include a computer instruction. When the computer instruction runs on a computer, a network device is enabled to perform the network OAM method according to any one of the first aspect and the possible implementations of the first aspect.

It should be understood that for beneficial effects achieved by the technical solutions in the second aspect to the fifth aspect and the corresponding possible implementations of the embodiments of this application, refer to the technical effects of the first aspect and the corresponding possible implementations of the first aspect. Details are not described herein again.

DESCRIPTION OF EMBODIMENTS

The term "and/or" in this specification is merely an association relationship for describing associated objects, and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first network device, a second network device, and the like are used to distinguish different network devices, but are not used to describe a specific sequence of the network devices.

In addition, in embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

In the description of the embodiment of this application, unless otherwise stated, "multiple" means two or more than two. For example, a plurality of processing units refers to two or more processing units. A plurality of systems refer to two or more systems.

First, some concepts related to a network OAM method and apparatus provided in embodiments of this application are described.

Network OAM refers to collection of OAM information by network devices. OAM is defined as follows:
(1) Monitors performance and generates maintenance information to evaluate network stability based on the maintenance information.
(2) Detects network faults through periodical query and generates various maintenance and alarm information.
(3) Schedules or switches services to other entities to ensure normal network operation when a network fault occurs.
(4) Transfers fault information to a management entity (for example, a controller).

In conclusion, the network OAM may include fault detection, path discovery, fault locating, and performance monitoring. In the following embodiments, a network OAM process is described in detail with reference to the technical solutions provided in this application.

Figure 1:
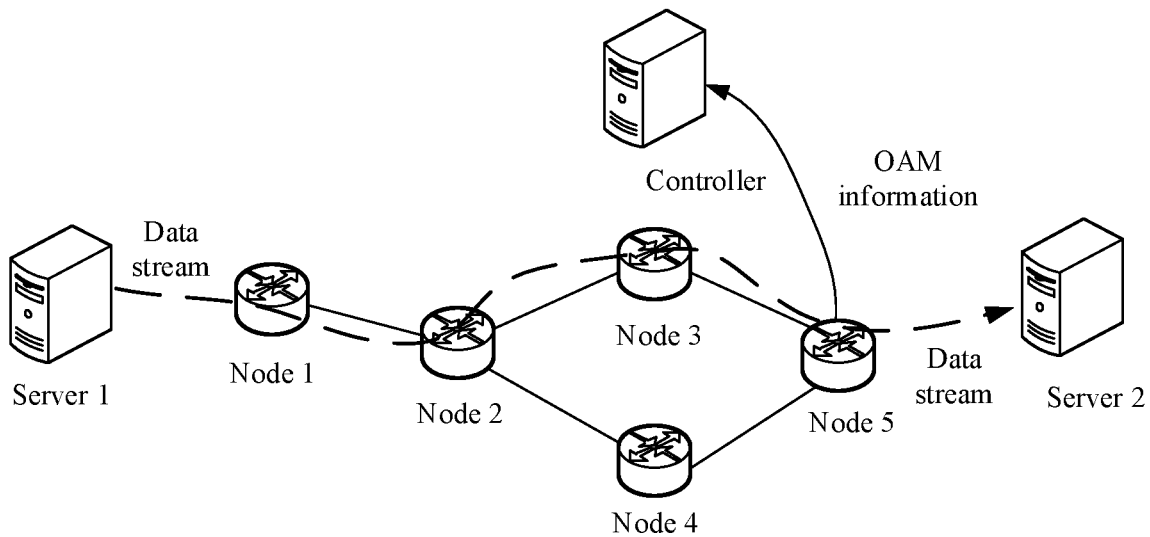
FIG. 1 is an application scenario of a network OAM method according to an embodiment of this application.

An OAM domain refers to a set of all nodes that support an OAM function (that is, support collection of OAM information) in a network. For example, a set of a node 2, a node 3, and a node 5 in FIG. 1 is an OAM domain, where the node 2 is an ingress node (which may also be referred to as a head node) of the OAM domain, and the ingress node is responsible for determining OAM configuration information, the node 5 is an egress node (which may also be referred to as an egress node) of the OAM domain, and the egress node is responsible for reporting OAM information collected by each node in the OAM domain to a controller.

To resolve the problem described in the background, embodiments of this application provide a network OAM method and apparatus. A first network device in a network may determine OAM configuration information of a target application, and the first network device forwards the OAM configuration information to a second network device. It can be learned that, according to the technical solutions in the embodiments of this application, the first network device can determine the OAM configuration information for the target application. Therefore, the OAM configuration manner is more flexible.

Further, the network device that needs to collect OAM information in the network collects and reports the OAM information according to the OAM configuration information. Because the OAM configuration information determined by the first network device is determined based on the characteristic information of the target application, the OAM information collected according to the OAM configuration information can more accurately reflect a running status of the target application to some extent, and therefore an OAM effect of the network can be improved.

That is, according to the network OAM method provided in this embodiment of this application, OAM for a specific target application can be implemented, so that OAM pertinence is improved, and an OAM effect is improved.

It should be noted that, in this embodiment of this application, the first network device is a head node or an ingress node (that is, a start node that performs an OAM function in a network) on a forwarding path corresponding to the target application (that is, the target APP), and the second network device is a next-hop device of the first network device. Optionally, the first network device and the second network device may be a routing device or a switching device, for example, a router or a switch.

The OAM configuration information is used by the network device in the network to collect the OAM information, and the OAM information is used to analyze the running status (for example, a latency status or a packet loss status) of the target application.

Figure 2:
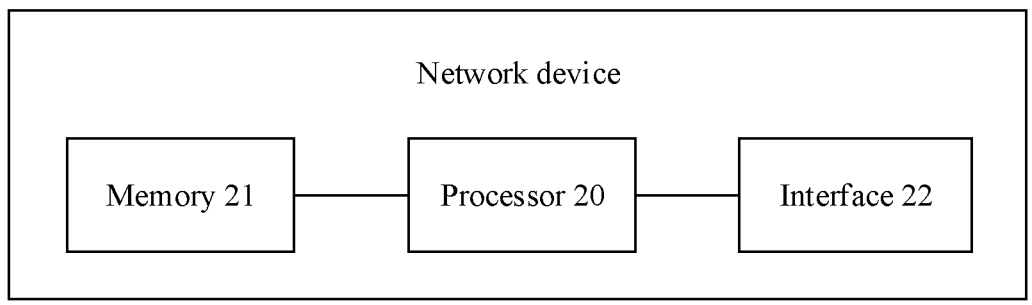
FIG. 2 is a schematic diagram of hardware of a network device according to an embodiment of this application.

For example, a hardware structure of the first network device is described by using an example in which the first network device is a router. FIG. 2 is a schematic diagram of hardware of a router according to an embodiment of this application. As shown in FIG. 2, the router provided in this embodiment of this application includes components such as a processor 20, a memory 21, and an interface 22. The following illustrates the components of the router.

The processor 20 is responsible for exchanging routing information, searching a routing table, and processing data (including encapsulation or de-capsulation), for example, processing various tables for maintaining the router and route calculation.

The memory 21 is configured to store configurations, an operating system, routing protocol software, and the like of the router. The router may have a plurality of types of memories, such as a read-only memory (ROM), a random access memory (RAM), a dynamic random-access memory (DRAM), and a flash memory (Flash).

The interface 22 is used by the router to send and receive data packets. The interface 22 in the router includes a local area network interface and a wide area network interface. In addition, the router does not have an input device or a terminal display device, and the router interface further includes a control port, used by a user or an administrator to communicate with the router by using a terminal, to complete router configuration.

With reference to the foregoing description about the concepts and the hardware structure of the router, the following describes in detail the network OAM method and apparatus provided in the embodiments of this application.

Figure 3:
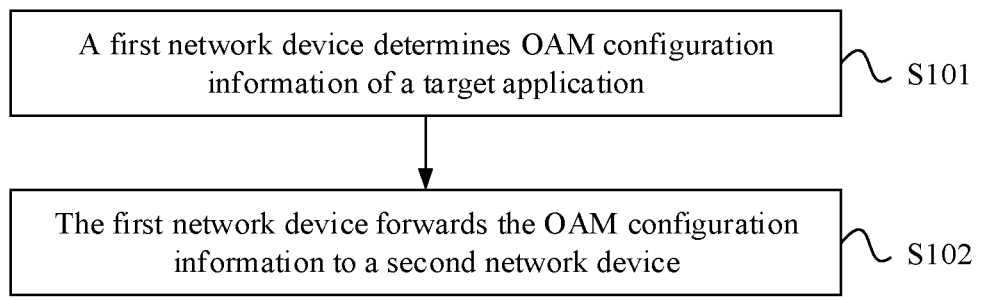
FIG. 3 is a schematic diagram 1 of a network OAM method according to an embodiment of this application.

As shown in FIG. 3, the network OAM method provided in this embodiment of this application may include S101 to S102.

S101. A first network device determines OAM configuration information of a target application.

The OAM configuration information includes an OAM measurement manner.

In this embodiment of this application, the OAM measurement manner may include at least one of the following manners: an IOAM manner, an IPFPM manner, an IFIT manner, a TWAMP manner, and an OWAMP manner, and a ping (ping to check whether the network is connected) manner.

Optionally, in this embodiment of this application, the OAM configuration information may further include at least one of the following information: an OAM measurement object, a measurement granularity, and a measurement frequency.

It should be understood that the OAM measurement object may include at least one of a latency, a packet loss rate, and an available bandwidth. The OAM measurement granularity may include per-flow or per-packet. The OAM measurement frequency may be a sending frequency of a data packet (or a measurement packet).

It should be noted that, in this embodiment of this application, when the OAM is performed on the network, the OAM may be performed based on the actual service of the target application (which may be understood as flow-by-flow measurement), or the active OAM may be performed on the forwarding path corresponding to the target application (which may be understood as path measurement). When the OAM is performed based on the actual service of the target application, the OAM configuration information may include a measurement granularity, and the OAM measurement manner may include an IOAM manner, an IPFPM manner, and an IFIT manner. When the active OAM is performed on the forwarding path of the target application, the OAM configuration information may include a measurement frequency, and the OAM measurement manner may include a TWAMP manner, an OWAMP manner, a ping manner, and the like.

S102. The first network device forwards the OAM configuration information to a second network device.

In this embodiment of this application, after the first network device determines the OAM configuration information, the first network device encapsulates the OAM configuration information into a packet received by the first network device, and forwards the packet to the second network device, so that the second network device collects OAM information based on the OAM configuration information.

Optionally, the OAM information collected by the network device varies according to OAM measurement objects. For example, in an implementation, when the OAM measurement object is a latency, the OAM information collected by the network device may include a timestamp, a node ID, and an interface ID, where the interface ID may include an inbound interface and an outbound interface of a packet, the timestamp may include a time when the packet arrives at the inbound interface and a time when the packet leaves the outbound interface. A controller may determine, based on the timestamp, a latency of a packet of the target application in a forwarding process, for example, a latency from a head node to a tail node or a latency between two adjacent nodes. In an implementation, when the OAM measurement object is a packet loss rate, the OAM information collected by the network device may include a node ID, an interface ID, and a sequence number. The controller may compare a sequence number of a data packet sent by a transmit end with a sequence number of a data packet received by a receive end, to determine a quantity of lost data packets, thereby determining a packet loss rate.

Figure 4:
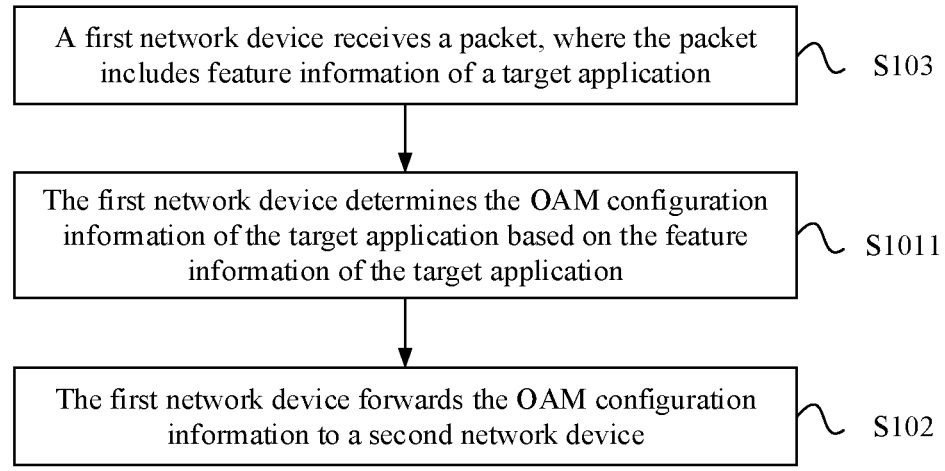
FIG. 4 is a schematic diagram 2 of a network OAM method according to an embodiment of this application.

Optionally, with reference to FIG. 3, as shown in FIG. 4, before S101, the network OAM method provided in this embodiment of this application may further include S103.

S103. The first network device receives a packet, where the packet includes characteristic information of the target application.

In this embodiment of this application, the packet received by the first network device is a packet of the target application, the packet includes an information header of the target application (referred to as an APP information header hereinafter), and the APP header includes the characteristic information of the target application. After receiving the packet, the first network device decapsulates the packet, to obtain the characteristic information of the target application from the APP information header. For example, the APP header is an Internet Protocol version 6 (IPv6) extension header that carries the characteristic information of the target application, such as a User ID, APP ID, or network performance requirements (such as bandwidth, or latency, etc.) of the APP. The IPv6 extension header includes Routing header, Hop-by-Hop Options header, or Destination Options header.

It should be noted that, in this embodiment of this application, when the OAM is performed based on the actual service of the target application, the packet may be a packet corresponding to the actual service of the target application. When the active OAM is performed on the forwarding path corresponding to the target application, the packet is a test packet.

As shown in FIG. 4, S101 may be specifically implemented by S1011.

S1011. The first network device determines the OAM configuration information of the target application based on the characteristic information of the target application.

Specifically, the characteristic information of the target application may include service requirement information of the target application or identification information of the target application. To be specific, the APP information header of the packet received by the first network device includes the service requirement information of the target application or the identification information of the target application (denoted as an APP ID in the following embodiment). The first network device decapsulates the packet received by the first network device, and obtains the service requirement information of the target application or the identification information of the target application from the APP information header of the packet.

The service requirement information may also be referred to as an SLA parameter. The service requirement information may include but is not limited to at least one of latency information, packet loss information, and bandwidth information. The latency information may include one or more of an end-to-end latency, a hop-by-hop latency, and a forwarding latency. The packet loss information may include a packet loss rate. The bandwidth information may include available bandwidth.

Optionally, the service requirement information may further include an upper limit of the latency information and/or an upper limit of the packet loss information. For example, the service requirement information specifies that a maximum end-to-end latency is less than 3 milliseconds and/or a maximum packet loss rate is less than 0.0001.

In an implementation, the service requirement information may further include color information (which may also be referred to as an SLA color) of the service requirement, and the color information of the service requirement may implicitly indicate one or more of the latency information, the packet loss information, and the bandwidth information.

Figure 5:
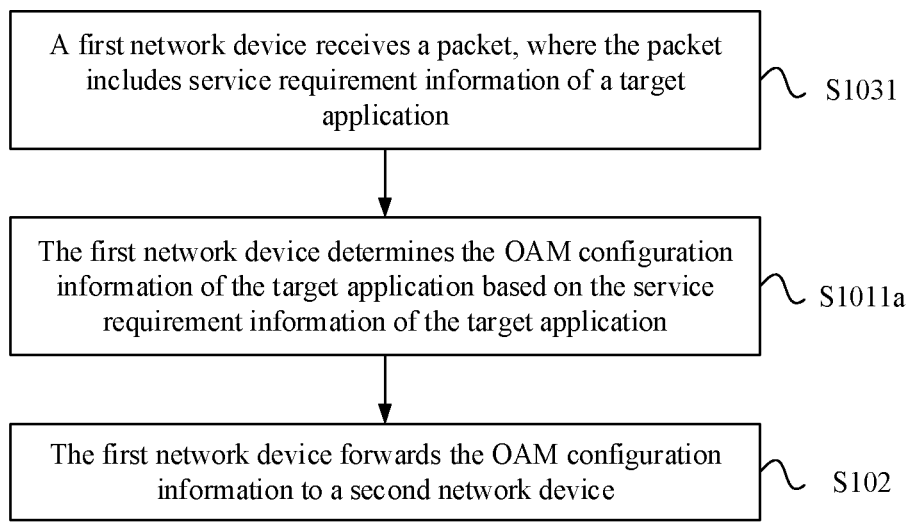
FIG. 5 is a schematic diagram 3 of a network OAM method according to an embodiment of this application.

With reference to FIG. 4, as shown in FIG. 5, in an implementation, S103 may be replaced with S1031, and S1011 may be replaced with S1011a.

S1031. The first network device receives a packet and the packet includes service requirement information of the target application.

S1011a. The first network device determines the OAM configuration information of the target application based on the service requirement information of the target application.

In this embodiment of this application, the first network device may determine the OAM configuration information based on content of the service requirement information. For example, when the OAM is performed based on the actual service of the target application, if the service requirement information specifies that a maximum packet loss rate is less than a value, the first network device may determine, based on the requirement of the target application for the packet loss rate (that is, the maximum packet loss rate is less than the specified value), that the measurement object in the OAM configuration information is the packet loss rate, and determine an OAM measurement manner and a measurement granularity when the OAM is performed for the packet loss rate. When the active OAM is performed based on the forwarding path corresponding to the target application, if the service requirement information is a latency and the maximum end-to-end latency is less than a value, the first network device determines, based on the latency requirement of the target application (that is, the maximum end-to-end latency is less than the specified value), that the measurement object in the OAM configuration information is the latency, and also determines an OAM measurement manner and a measurement frequency when the OAM is performed for the latency.

Optionally, in this embodiment of this application, the first network device may determine, based on a strict degree of a requirement of the target application for the latency, a packet loss rate, and the like, whether to perform OAM based on the actual service of the target application or perform OAM based on the forwarding path corresponding to the target application, that is, to perform flow-by-flow measurement or active measurement.

In an example, applications such as interactive Internet Protocol television (IPTV) and streaming media are relatively sensitive to packet loss, and severe packet loss may cause unacceptable consequences such as mosaics. In this case, the OAM may be performed based on the actual service of the target application. Specifically, service requirement information of a packet loss rate requirement of the target application is carried in a packet of the target application so that the OAM configuration information (including a measurement manner, a measurement object, and a measurement granularity) is determined. For example, the OAM measurement manner is IPFPM, the OAM object is a packet loss rate, and the OAM measurement granularity is per packet.

In another example, applications such as live broadcast and virtual reality (VR) are relatively latency-sensitive, and an excessively large latency may cause poor user experience. In this case, the OAM may be performed based on the actual service of the target application. Specifically, service requirement information of a latency requirement of the target application is carried in a packet of the target application, so that the OAM configuration information (including a measurement manner, a measurement object, and a measurement granularity) is determined. For example, the OAM measurement manner is IOAM, the OAM object is a latency, and the OAM measurement granularity is per packet.

In this embodiment of this application, an example in which the active OAM is performed on the forwarding path corresponding to the target application is used. The service requirement information is a latency, and the target application has a relatively low latency requirement. For example, a maximum end-to-end latency is less than 50 milliseconds. In this case, the first network device may select a latency-insensitive OAM measurement manner, for example, TWAMP. Because the target application does not have high requirements on latency, a low measurement frequency can be used.

It should be understood that different service requirements (a latency, a packet loss rate, a bandwidth, or the like) of the target application may correspond to different OAM configuration information. Specifically, the OAM configuration information may be selected based on an actual usage. This is not limited in this embodiment of this application.

Optionally, in this embodiment of this application, the OAM measurement manner in the OAM configuration information of the target application may be determined based on whether the network device supports the OAM measurement manner. For example, if the network device supports only the IOAM manner, the OAM measurement manner in the OAM configuration information of the target application is the IOAM manner.

In conclusion, the first network device determines the OAM configuration information for the target application based on the service requirement information of the target application carried in the data packet (for example, different service requirements may correspond to different OAM configuration information), so that the OAM configuration manner is more flexible.

Figure 6:
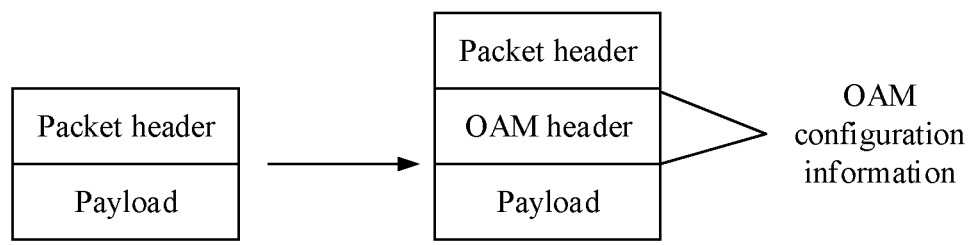
FIG. 6 is a schematic diagram of encapsulation of OAM configuration information according to an embodiment of this application.

In this embodiment of this application, after the first network device determines the OAM configuration information based on the service requirement information of the target application, the first network device adds the OAM configuration information to a packet received by the first network device, and forwards the packet to the second network device. For example, with reference to FIG. 6, how the first network device adds the OAM configuration information to the packet may be understood. Specifically, the first network device adds an OAM header to the packet received by the first network device, encapsulates the OAM configuration information into the OAM header of the packet, and further forwards the packet to the second network device.

Optionally, in this embodiment of this application, which devices (namely, nodes) in the network need to collect the OAM information may be pre-configured. In other words, for each device in the network, whether the device needs to collect the OAM information may be configured. Specifically, which devices need to collect the OAM information may be configured based on an actual requirement. This is not limited in this embodiment of this application.

For example, a network device receives a packet sent by a previous-hop network device of the network device. If the network device is configured to collect the OAM information, the network device decapsulates the received packet to obtain the OAM configuration information, collects the OAM information according to the OAM configuration information, and then encapsulates the OAM information into the OAM header of the packet. Then, the packet including the OAM configuration information and the OAM information is sent to a next-hop network device of the network device. Otherwise, the network device does not collect the OAM information, and directly forwards the packet including the OAM configuration information to the next-hop network device of the network device.

Figure 7:
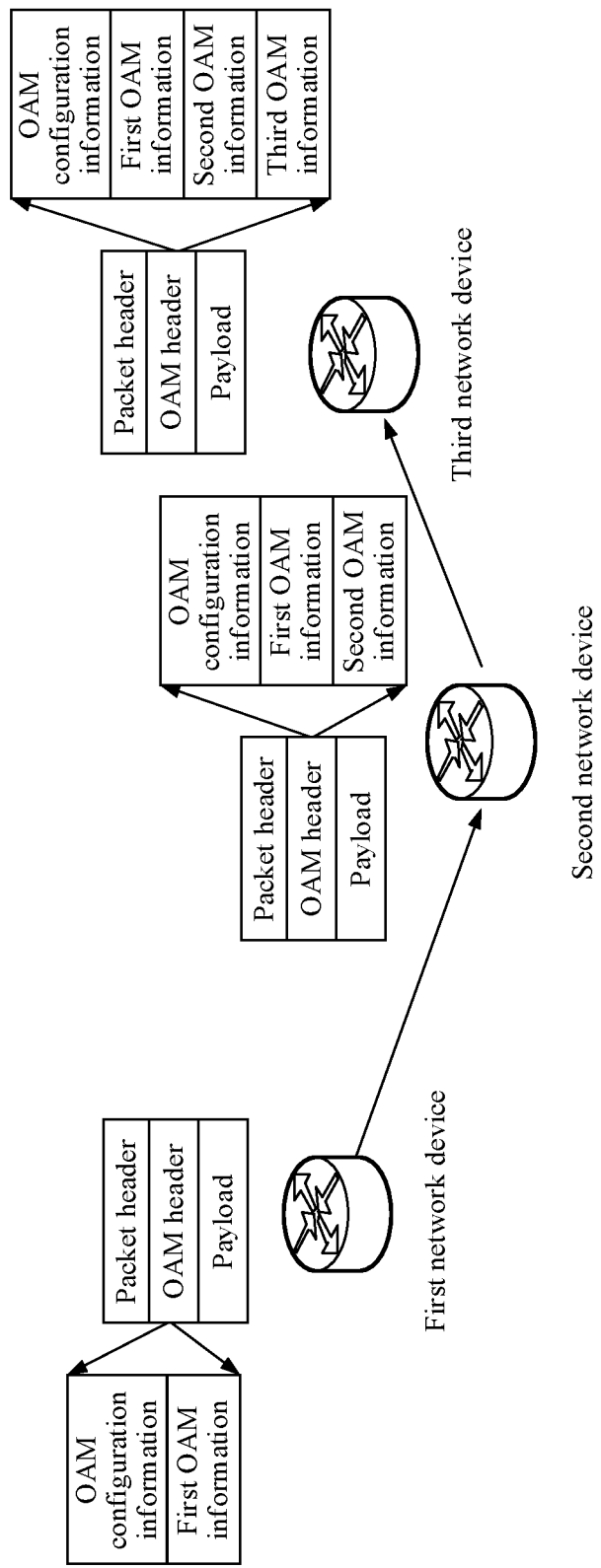
FIG. 7 is a schematic diagram of an OAM information collection process according to an embodiment of this application.

In this embodiment of this application, it is assumed that the first network device is an ingress node of the OAM domain, a next-hop node of the first network device is the second network device, a next-hop node of the second network device is a third network device, and the third network device is an egress node of the OAM domain. A case in which the first network device, the second network device, and the third network device all need to collect the OAM information is used as an example. As shown in FIG. 7, an OAM information collection process is described with reference to a packet forwarding process.

After the first network device determines the OAM configuration information of the target application, the first network device may collect the OAM information according to the OAM configuration information. Herein, the OAM information collected by the first network device is denoted as first OAM information. Then, the first network device encapsulates the OAM configuration information and the first OAM information into a packet. (For details, refer to the description in the foregoing embodiment: The first network device adds an OAM header to the received packet, encapsulates the OAM configuration information and the first OAM information into the OAM header of the packet, and then sends the packet to the second network device.) It may be understood that the packet sent by the first network device to the second network device carries the OAM configuration information and the first OAM information.

After receiving the packet sent by the first network device, the second network device decapsulates the packet to obtain the OAM configuration information, and collects the OAM information according to the OAM configuration information. Herein, the OAM information collected by the second network device is denoted as second OAM information. Then, the second network device encapsulates the second OAM information into the packet received by the second network device. (Specifically, the second network device encapsulates the second OAM information into the OAM header of the packet, and then sends the second OAM information to the third network device). It may be understood that the packet sent by the second network device to the third network device carries the OAM configuration information, the first OAM information, and the second OAM information.

After receiving the packet sent by the second network device, the third network device decapsulates the packet to obtain the OAM configuration information, and collects OAM information according to the OAM configuration information. Herein, the OAM information collected by the third network device is denoted as third OAM information. It can be learned that the third network device has obtained the first OAM information, the second OAM information, and the third OAM information. Further, the third network device sends the first OAM information, the second OAM information, and the third OAM information to a controller in the network. Alternatively, the third network device encapsulates the third OAM information into the OAM header of the packet, and sends the OAM header including the first OAM information, the second OAM information, and the third OAM information to a controller in the network, so that the controller analyzes the OAM information, to determine a running status of the target application.

Figure 8:
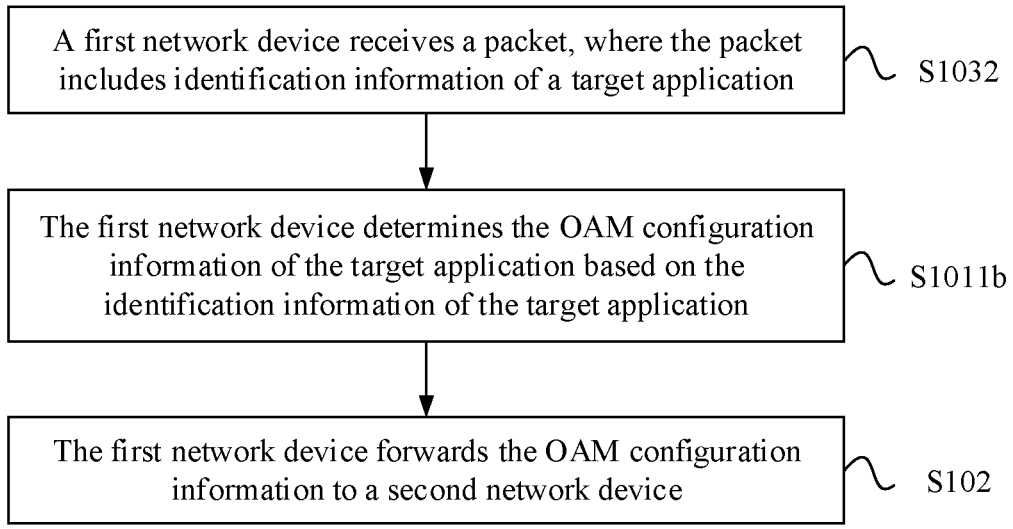
FIG. 8 is a schematic diagram 4 of a network OAM method according to an embodiment of this application.

With reference to FIG. 4, as shown in FIG. 8, in another implementation, S103 may be replaced with S1032, and S1011 may be replaced with S1011b.

S1032. The first network device receives a packet and the packet includes identification information of the target application.

S1011b. The first network device determines OAM configuration information of the target application based on the identification information of the target application.

In this embodiment of this application, a correspondence between identification information of an application and OAM configuration information is configured on the first network device. After obtaining the identification information of the target application, the first network device first matches the identification information of the target application based on the correspondence between the identification information of the application and the OAM configuration information, and further determines that OAM configuration information corresponding to the identification information of the target application is the OAM configuration information of the target application.

For example, Table 1 is an example of a correspondence between the identification information of applications and OAM configuration information.

TABLE 1

| APP ID | OAM configuration information |
|--------|-------------------------------|
| ID 1   | OAM configuration information 1 |
| ID 2   | OAM configuration information 2 |
| ID 3   | OAM configuration information 3 |
| ID 4   | OAM configuration information 4 |
| ID 5   | OAM configuration information 5 |

With reference to Table 1, the APP ID obtained by the first network device from the packet is ID 3, and the first network device may determine that the OAM configuration information of the target application is the OAM configuration information 3 in Table 1.

It should be noted that, in this embodiment of this application, when the first network device matches the identification information of the target application based on the APP ID in the packet received by the first network device (for example, the identification information of the target application does not exist in Table 1), the first network device forwards the determined identification information of the OAM to the second network device. In this way, the second network device may obtain the OAM configuration information and determine, based on an actual situation, whether to collect the OAM information (that is, whether to perform an OAM function). Similarly, another subsequent network device may also obtain the OAM configuration information and determine whether to collect the OAM information. When the first network device does not match the identification information of the target application, the first network device, the second network device, and another subsequent network device do not collect the OAM information (that is, do not perform an OAM function), and only normally forward the packet.

With reference to the foregoing description of S1011a or S1011b, optionally, the packet received by the first network device may include an OAM measurement manner in the OAM configuration information. In other words, the OAM measurement manner may be preconfigured and carried in the packet. In this way, after receiving the packet, the first network device may obtain the OAM measurement manner (for example, specifies that the OAM measurement manner is an IOAM manner in the packet). In this case, after the first network device obtains the service requirement information of the target application or the identification information of the target application from the packet, the first network device determines other information (for example, a measurement object, a measurement granularity, or a measurement frequency) in the OAM configuration information based on the service requirement information of the target application or the identification information of the target application. Further, when the first network device does not need to collect the OAM information, the first network device forwards the OAM configuration information to the second network device. When the first network device needs to collect the OAM information, the first network device collects the OAM information based on the OAM configuration information, and forwards the OAM configuration information and the OAM information to the second network device.

Herein, it should be noted that, in a case in which the packet carries the OAM measurement manner, the first network device encapsulates only the determined OAM measurement object, the OAM measurement granularity, or the measurement frequency into the packet (because the packet already includes the OAM measurement manner).

In conclusion, the first network device determines the OAM configuration information for the target application based on the service requirement information of the target application carried in the data packet (for example, different service requirements may correspond to different OAM configuration information), so that the OAM configuration manner is more flexible.

In conclusion, the first network device determines the OAM configuration information for the target application based on the identification information of the target application carried in the data packet (for example, different applications may be configured with different OAM configuration information), so that the OAM configuration manner is more flexible.

Figure 9:
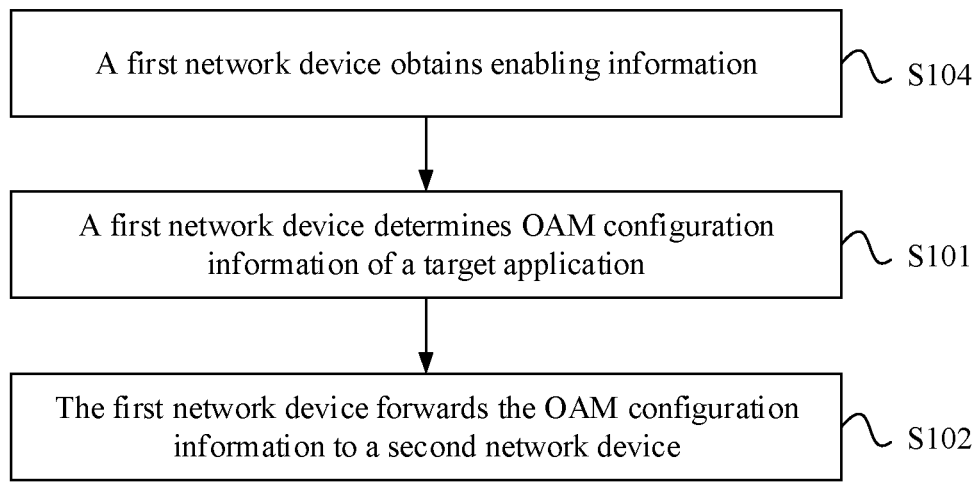
FIG. 9 is a schematic diagram 5 of a network OAM method according to an embodiment of this application.

Optionally, with reference to FIG. 3, as shown in FIG. 9, before S101, the network OAM method provided in this embodiment of this application may further include S104.

S104. The first network device obtains enabling information.

The enabling information is used to instruct the first network device to determine the OAM configuration information of the target application.

Optionally, in this embodiment of this application, the enabling information is indication information (for example, an instruction), and the enabling information may be carried in the packet received by the first network device. Alternatively, the enabling information may be preconfigured on the first network device.

In this embodiment of this application, the first network device may determine, based on a value of the indication information, whether the OAM configuration information of the target application needs to be determined. For example, "0" or "1" may be used to represent the enabling information. For example, "1" may be used to indicate enabling, which means that the first network device needs to determine the OAM configuration information, or "0" may be used to indicate enabling. Certainly, in this embodiment of this application, another flag that meets an actual use requirement may be used to set the foregoing enabling information. Details are not listed one by one in this embodiment of this application.

In an implementation, "1" may be used to indicate enabling, and "0" may be used to indicate disabling. In other words, when the value of the enabling information is 1, the first network device determines the OAM configuration information, and when the value of the enabling information is 0, the first network device does not determine the OAM configuration information, and only forwards the packet normally.

Optionally, in this embodiment of this application, the identification information of the target application may be used as the enabling information. In this case, when the packet received by the first network device includes the APP ID, the first network device determines the OAM configuration information of the target application, and forwards the packet including the OAM configuration information to the second network device. When the packet received by the first network device does not include the APP ID (or the APP ID is empty), the first network device does not determine the OAM configuration information of the target application, and only forwards the packet.

According to the network OAM method provided in this embodiment of this application, the first network device in the network determines the OAM configuration information of the target application, and the first network device forwards the OAM configuration information to the second network device. It can be learned that, according to the technical solutions in the embodiments of this application, the OAM configuration information for the target application can be determined. Therefore, the OAM configuration manner is more flexible. Further, the network device that needs to collect OAM information in the network collects and reports the OAM information according to the OAM configuration information. Because the OAM configuration information determined by the first network device is determined based on the characteristic information of the target application, the OAM information collected according to the OAM configuration information can more accurately reflect a running status of the target application to some extent, and therefore an OAM effect of the network can be improved.

That is, according to the network OAM method provided in this embodiment of this application, OAM for a specific target application can be implemented, so that OAM pertinence is improved, and an OAM effect is improved.

In this embodiment of this application, the first network device may be divided into functional modules based on the foregoing method examples. For example, each functional module may be obtained through division based on a corresponding function, or two or more functions may be integrated into one processing module. The integrated module may be implemented in a form of hardware, or may be implemented in a form of a functional software module. It should be noted that module division in this embodiment of this application is an example, and is merely logical function division. In actual implementation, another division manner may be used.

Figure 10:
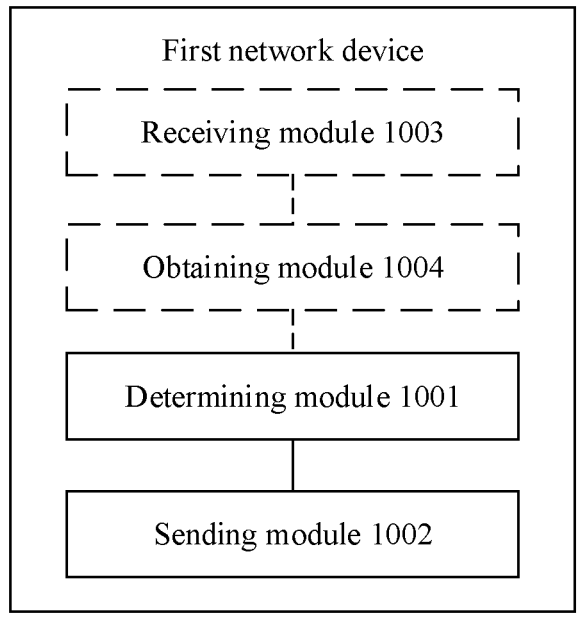
FIG. 10 is a schematic structural diagram 1 of a first network device according to an embodiment of this application.

FIG. 10 is a possible schematic structural diagram of the first network device in the foregoing embodiment in a case that each functional module is obtained through division based on a corresponding function. As shown in FIG. 10, the first network device may include a determining module 1001 and a sending module 1002. The determining module 1001 may be configured to support the first network device in performing S101 (including S1011, and S1011 may be replaced with S1011*a* or S1011*b*) in the foregoing method embodiment. The sending module 1002 may be configured to support the first network device in performing S102 in the foregoing method embodiment.

Optionally, as shown in FIG. 10, the first network device may further include a receiving module 1003. The receiving module 1003 may be configured to support the first network device in performing S103 (which may be replaced with S1031 or S1032) in the foregoing method embodiment.

Optionally, as shown in FIG. 10, the first network device may further include an obtaining module 1004. The obtaining module 1004 may be configured to support the first network device in performing S104 in the foregoing method embodiment.

All related content of the steps in the foregoing method embodiments may be referenced to function descriptions of corresponding functional modules, and details are not described herein again.

Figure 11:
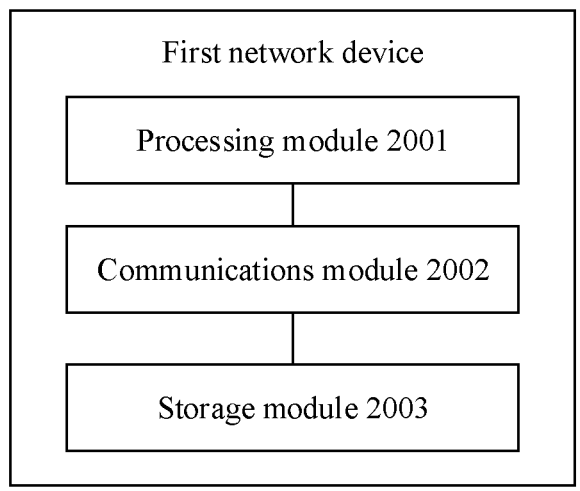
FIG. 11 is a schematic structural diagram 2 of a first network device according to an embodiment of this application.

FIG. 11 is a possible schematic structural diagram of the first network device in the foregoing embodiment in a case that an integrated unit is used. As shown in FIG. 11, the first network device may include a processing module 2001 and a communications module 2002. The processing module 2001 may be configured to control and manage an action of the apparatus. For example, the processing module 2001 may be configured to support the first network device in performing S101 (including S1011, and S1011 may be replaced with S1011a or S1011b) and S104 in the foregoing method embodiment, and/or other processes of the technology described herein. The communications module 2002 may be configured to support the first network device in communicating with another network entity. For example, the communications module 2002 may be configured for the apparatus to perform S102 and S103 (which may be replaced with S1031 or S1032) in the foregoing method embodiments. Optionally, as shown in FIG. 11, the first network device may further include a storage module 2003, store program code and data of the first network device.

The processing module 2001 may be a processor or a controller (for example, may be the processor 20 shown in FIG. 2). For example, the processing module 2001 may be a central processing unit (CPU), a general-purpose processor, a digital signal processor (DSP), or an application-specific integrated circuit (ASIC), a field-programmable gate array (FPGA), or another programmable logic device, a transistor logic device, a hardware component, or any combination thereof. The processing module may implement or execute various example logical blocks, modules, and circuits described with reference to content disclosed in the embodiments of this application. Alternatively, the processor may be a combination of processors that implement a computing function, for example, a combination of one or more microprocessors, a combination of a DSP and a microprocessor, or the like. The communications module 2002 may be a transceiver, a transceiver circuit, a communications interface (for example, may be the interface 22 shown in FIG. 2), and the storage module 2003 may be a memory (for example, may be the memory 21 shown in FIG. 2).

When the processing module 2001 is a processor, the communications module 2002 is a transceiver, and the storage module 2003 is a memory, the processor, the transceiver, and the memory may be connected by using a bus. The bus may be a Peripheral Component Interconnect (PCI) bus, an Extended Industry Standard Architecture (EISA) bus, or the like. The bus may be classified into an address bus, a data bus, a control bus, and the like.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital versatile disc (DVD)), a semiconductor medium (for example, solid-state drives (SSDs), or the like.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   storing correspondence information comprising application identifiers for a plurality of applications and operation, administration, and maintenance (OAM) configuration information for each of the plurality of applications;
   receiving a first packet comprising a first packet header, wherein the first packet header comprises first characteristic information associated with a target application, and wherein the first characteristic information comprises one of the application identifiers that corresponds to the target application;
   obtaining, based on the correspondence information and the first characteristic information, the OAM configuration information of the target application, wherein the OAM configuration information of the target application comprises an OAM measurement manner;
   forwarding, in response to the correspondence information comprising the OAM configuration information for the first packet, the first packet and the OAM configuration information to a network device;
   receiving a second packet comprising a second packet header, wherein the second packet header comprises second characteristic information, and wherein the second characteristic information does not comprise one of the application identifiers in the correspondence information; and
   forwarding, in response to the correspondence information not comprising any OAM configuration information for the second packet, the second packet without any OAM configuration information to the network device.

2. The method of claim 1, wherein the first characteristic information further comprises service requirement information of the target application.

3. The method of claim 2, wherein the service requirement information comprises at least one of latency information, packet loss information, or bandwidth information.

4. The method of claim 1, wherein the first packet comprises the OAM measurement manner.

5. The method of claim 1, wherein the OAM measurement manner comprises at least one of an In-Situ Operation, Administration, and Maintenance (IOAM) manner, an Internet Protocol Flow Performance Measurement (IPFPM) manner, an In-Situ Flow Information Telemetry (IFIT) manner, a Two-way Active Measurement Protocol (TWAMP) manner, a One-way Active Measurement Protocol (OWAMP) manner, or a ping manner.

6. The method of claim 1, wherein the OAM configuration information of the target application further comprises at least one of an OAM measurement object, a measurement granularity, or a measurement frequency.

7. The method of claim 1, wherein before obtaining the OAM configuration information of the target application, the method further comprises obtaining enabling information, and wherein the enabling information instructs to obtain the OAM configuration information of the target application.

8. The method of claim 1, wherein the method is implemented by an ingress node of a network, wherein storing the correspondence information comprises storing a table in the ingress node, and wherein the table comprises the application identifiers and the OAM configuration information for each of the plurality of applications.

9. The method of claim 1, wherein the method is implemented by an ingress node or a head node, and wherein the network device comprises a next-hop device.

10. The method of claim 1, further comprising:
    collecting, based the OAM measurement manner, OAM information; and
    forwarding the OAM information.

11. An apparatus, comprising:
    a memory configured to store instructions; and
    one or more processors coupled to the memory and configured to execute the instructions to cause the apparatus to:
      store correspondence information comprising application identifiers for a plurality of applications and operation, administration, and maintenance (OAM) configuration information for each of the plurality of applications;
      receive a first packet comprising a first packet header, wherein the first packet header comprises first characteristic information associated with a target application, and wherein the first characteristic information comprises one of the application identifiers that corresponds to the target application;
      obtain, based on the correspondence information and the first characteristic information, the OAM configuration information of the target application, wherein the OAM configuration information of the target application comprises an OAM measurement manner;
      forward, in response to the correspondence information comprising the OAM configuration information for the first packet, the first packet and the OAM configuration information to a network device;
      receive a second packet comprising a second packet header, wherein the second packet header comprises second characteristic information, and wherein the second characteristic information does not comprise one of the application identifiers in the correspondence information; and
      forward, in response to the correspondence information not comprising any OAM configuration information for the second packet, the second packet without any OAM configuration information to the network device.

12. The apparatus of claim 11, wherein the first characteristic information further comprises service requirement information of the target application.

13. The apparatus of claim 11, wherein the OAM measurement manner comprises an In-Situ Operation, Administration, and Maintenance (IOAM) manner, an Internet Protocol Flow Performance Measurement (IPFPM) manner, an Internet Protocol Flow Performance (IPFPM) manner, an In-Situ Flow Information Telemetry (IFIT) manner, a Two-way Active Measurement Protocol (TWAMP) manner, a One-way Active Measurement Protocol (OWAMP) manner, and a ping manner.

14. The apparatus of claim 11, wherein the instructions further cause the apparatus to obtain enabling information, and wherein the enabling information instructs the apparatus to obtain the OAM configuration information of the target application.

15. A computer program product comprising instructions stored on a non-transitory computer-readable medium that, when executed by one or more processors, cause an apparatus to:
    store correspondence information comprising application identifiers for a plurality of applications and operation, administration, and maintenance (OAM) configuration information for each of the plurality of applications;

receive a first packet comprising a first packet header, wherein the first packet header comprises first characteristic information associated with a target application, and wherein the first characteristic information comprises one of the application identifiers that corresponds to the target application;

obtain, based on the correspondence information and the first characteristic information, the OAM configuration information of the target application, wherein the OAM configuration information of the target application comprises an OAM measurement manner;

forward, in response to the correspondence information comprising the OAM configuration information for the first packet, the first packet and the OAM configuration information to a network device;

receive a second packet comprising a second packet header, wherein the second packet header comprises second characteristic information, and wherein the second characteristic information does not comprise one of the application identifiers in the correspondence information; and forward, in response to the correspondence information not comprising any OAM configuration information for the second packet, the second packet without any OAM configuration information to the network device.

16. The computer program product of claim 15, wherein the first characteristic information further comprises service requirement information of the target application.

17. The computer program product of claim 16, wherein the service requirement information comprises at least one of latency information, packet loss information, or bandwidth information.

18. The computer program product of claim 15, wherein the first packet comprises the OAM measurement manner.

19. The computer program product of claim 15, wherein the OAM measurement manner comprises at least one of an In-Situ Operation, Administration, and Maintenance (IOAM) manner, an Internet Protocol Flow Performance (IPFPM) manner, an In-Situ Flow Information Telemetry (IFIT) manner, a Two-way Active Measurement Protocol (TWAMP) manner, a One-way Active Measurement Protocol (OWAMP) manner, and a ping manner.

20. The computer program product of claim 15, wherein the OAM configuration information of the target application further comprises at least one of an OAM measurement object, a measurement granularity, or a measurement frequency.

* * * * *